US012492956B2

(12) United States Patent
Von Muenster et al.

(10) Patent No.: US 12,492,956 B2
(45) Date of Patent: Dec. 9, 2025

(54) JUNCTION BANK FOR SCALE CONTROLLER AND LOAD CELL

(71) Applicant: SCALE TEC, LTD., Anamosa, IA (US)

(72) Inventors: Nicholas Von Muenster, Anamosa, IA (US); Dan Secrist, Anamosa, IA (US)

(73) Assignee: SCALE TEC, LTD., Anamosa, IA (US)

( * ) Notice: Subject to any disclaimer, the term of this patent is extended or adjusted under 35 U.S.C. 154(b) by 314 days.

(21) Appl. No.: 18/465,625

(22) Filed: Sep. 12, 2023

(65) Prior Publication Data

US 2024/0094082 A1    Mar. 21, 2024

Related U.S. Application Data

(60) Provisional application No. 63/408,541, filed on Sep. 21, 2022.

(51) Int. Cl.
*G01L 25/00* (2006.01)
*G01D 18/00* (2006.01)
*G01G 23/01* (2006.01)

(52) U.S. Cl.
CPC ............ *G01L 25/00* (2013.01); *G01D 18/008* (2013.01); *G01D 2218/10* (2021.05)

(58) Field of Classification Search
CPC .. G01L 25/00; G01D 18/008; G01D 2218/10; G01G 23/3735; G01G 23/01; G01G 3/14; G01G 23/3714; G01G 19/022; G01G 23/00; G01G 21/22; G01G 3/147; G01G 19/4142; G01G 23/3707; H01M 10/4257; H02J 7/0024; B60L 3/0046; G05B 23/0294; G05B 19/0425
USPC .................................................. 73/1.15, 199
See application file for complete search history.

(56) References Cited

U.S. PATENT DOCUMENTS

2005/0121236 A1*  6/2005  Lauke ................ G01G 19/4142
                                                            177/144

* cited by examiner

*Primary Examiner* — Brandi N Hopkins
(74) *Attorney, Agent, or Firm* — SHUTTLEWORTH & INGERSOLL, PLC; Jason R. Sytsma

(57) ABSTRACT

A plurality of analog signals each of which is representative of a portion of the load measured by a corresponding plurality of load cells. Converting the plurality of analog signals into a plurality of digital signals corresponding to the plurality of load cells. Running a diagnostic on each of the plurality of digital signals to determine an operational condition of each of the plurality of load cells.

17 Claims, 8 Drawing Sheets

Training Phase

Predictive Phase

| Position/Bias | A | B | C |
|---|---|---|---|
| Load Cell B Bias | 30% | 60% | 10% |

| Position/Bias | A | B | C |
|---|---|---|---|
| Load Cell C Bias | 20% | 20% | 60% |

| Position/Bias | A | B | C |
|---|---|---|---|
| Load Cell A&B Bias | 45% | 45% | 10% |

| Position/Bias    | A   | B  | C   | D   |
|------------------|-----|----|-----|-----|
| Load Cell C Bias | 20% | 5% | 55% | 20% |

| Position/Bias      | A   | B   | C   | D   |
|--------------------|-----|-----|-----|-----|
| Load Cell B&D Bias | 10% | 40% | 10% | 40% |

| Position/Bias    | A   | B   | C   | D   |
|------------------|-----|-----|-----|-----|
| Load Cell C Bias | 25% | 25% | 25% | 25% |

JUNCTION BANK FOR SCALE CONTROLLER AND LOAD CELL

CROSS-REFERENCE TO RELATED APPLICATIONS

The present application claims the benefit of U.S. provisional patent application No. 63/408,541 filed on Sep. 21, 2022, the contents of which are hereby incorporated by reference herein.

TECHNICAL FIELD

This description relates to electronic scale systems, and more specifically, relates to a smart junction bank for a scale controller and load cell.

BACKGROUND INFORMATION

Electronic scale systems, which comprises of load cells, supporting cabling, and a scale controller, are utilized and relied upon across a variety of agricultural applications. Scales improve efficiency, precision, and profitability by enabling accurate weighing of feed, seed, grain, fertilizers, and other products. Electronic scale systems, being electronic, are susceptible to failure when exposed to the harsh conditions present in agriculture. Moisture intrusion into the electronic components, corrosion of the load cell connections, physical damage to the load cell or cabling, and failure of components such as strain gauges can be common in the field. When these failures occur during operations, a farm's efficiency is decreased until repairs can be made or replacement parts can be obtained. Lessening the time needed to complete diagnostics and/or allowing the scale system to continue operating accurately without the failed components would provide a substantial advantage over current systems.

It is common practice in electronic scale system designs used for agriculture to utilize a junction box or junction bank to gather the analog signal from all of the load cells in a system and combine them in to a single analog signal. This combined analog signal is then passed on to the scale indicator where it can be processed and interpreted. Because the analog signals are combined in this way, diagnostics cannot be performed on individual components of the system without an operator manually disconnecting all other components. Diagnostics of existing systems are almost entirely reliant on the technical knowledge of the operator or service technician.

FIG. 1 depicts a prior art electronic scale system 100 and the components thereof. A scale indicator with integrated controller 101 has a visual display for weight readout and an interface for the user to control and interact with scale system 100. Scale indicator 101 traditionally contains a scale controller in communication with one or more sensors for measuring weight, these sensors can be implemented as load cells, which can be affixed between the undercarriage of a grain cart or the hopper body. The weight measurement can be in the form of a discrete weight at a given time or a difference in weight over a period of time to track offloading or offloading of grain. As shown in FIG. 1, scale indicator 101 is connected to a junction box 102, which is commonly used to combine two or more analog signals from a corresponding number of connected load cells 103 into a single analog signal for scale indicator 101.

Accordingly, for the reasons discussed above, there is a need for a smart junction box for a scale controller and load cell to assist with diagnostics.

SUMMARY

Disclosed herein is a method of weighing a load comprising receiving a plurality of analog signals each of which is representative of a portion of the load measured by a corresponding plurality of load cells. The method continues with converting the plurality of analog signals into a plurality of digital signals corresponding to the plurality of load cells. The method progresses to running a diagnostic on each of the plurality of digital signals to determine an operational condition of each of the plurality of load cells.

In an embodiment, the method continues comprises switching a state of operation between a training state and a predictive state based on the determination of the operational condition of each of the plurality of load cells, storing a data representative of the portion of the load measured by each of the corresponding plurality of load calls in the training state, and estimating the data representative of the portion of the load measured by a failed load cell of the plurality of load cells in the predictive state.

In an embodiment, the method comprises summing data from a group of load cells of the plurality of load cells to differentiate between a portion of the load measured by two or more groups of load cells of the plurality of load cells. In other embodiments, the method comprises communicating to an operator a diagnostic state of each load cell of the plurality of load cells. The method can also comprise generating a simulated output for a failed load cell.

In other embodiments, a scale controller is disclosed. The scale controller comprises a plurality of load cell ports each of which communicatively couplable to a corresponding one of a plurality of load cells to receive analog signals representative of a portion of a load thereon; an analog to digital convertor (ADC) communicatively coupled to the plurality of load cell ports to convert the analog signals into corresponding digital signals; and a microprocessor configured to run a diagnostic on each of the digital signals corresponding to each of the plurality of load cells to determine an operational state of each of the plurality of load cells.

In an embodiment, a user interface is in communication with the microprocessor to receive information representative of the operational state of each of the plurality of load cells. The microprocessor can sum data from a group of load cells of the plurality of load cells to differentiate between a portion of the load measured by two or more groups of load cells of the plurality of load cells. The microprocessor can generate a simulated output for a failed load cell.

Some embodiments comprise an AI module in communication with the microprocessor for storing in a library a data from each load cell of the plurality of load cells. The AI module can estimate data representative of a failed load cell of the plurality of load cells based on the data stored in the library corresponding to the failed load cell. The AI module can operate with respect to each load cell in a training state and a predictive state. In the training state, the library stores for each load cell of the plurality of load cells the data representative of the portion of the load thereon. Wherein the predictive state for the failed load cell of the plurality of load cells can be triggered by the diagnostic ran by the microprocessor. Wherein the AI module can estimate the data the data representative of the portion of the load on the failed load cell based on the data stored in the library.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
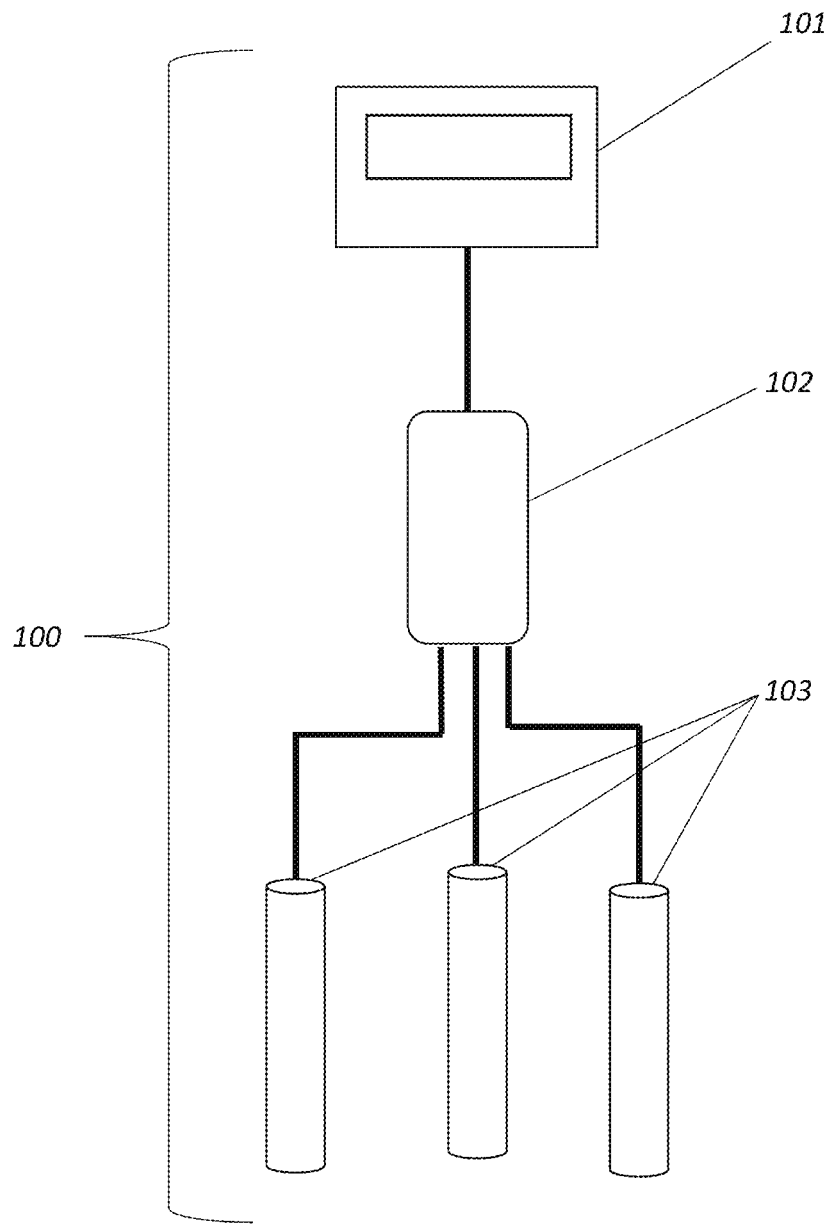
FIG. 1 is prior art depiction of the components of an electronic scale system with a scale indicator, junction box, and load cells.
Figure 2:
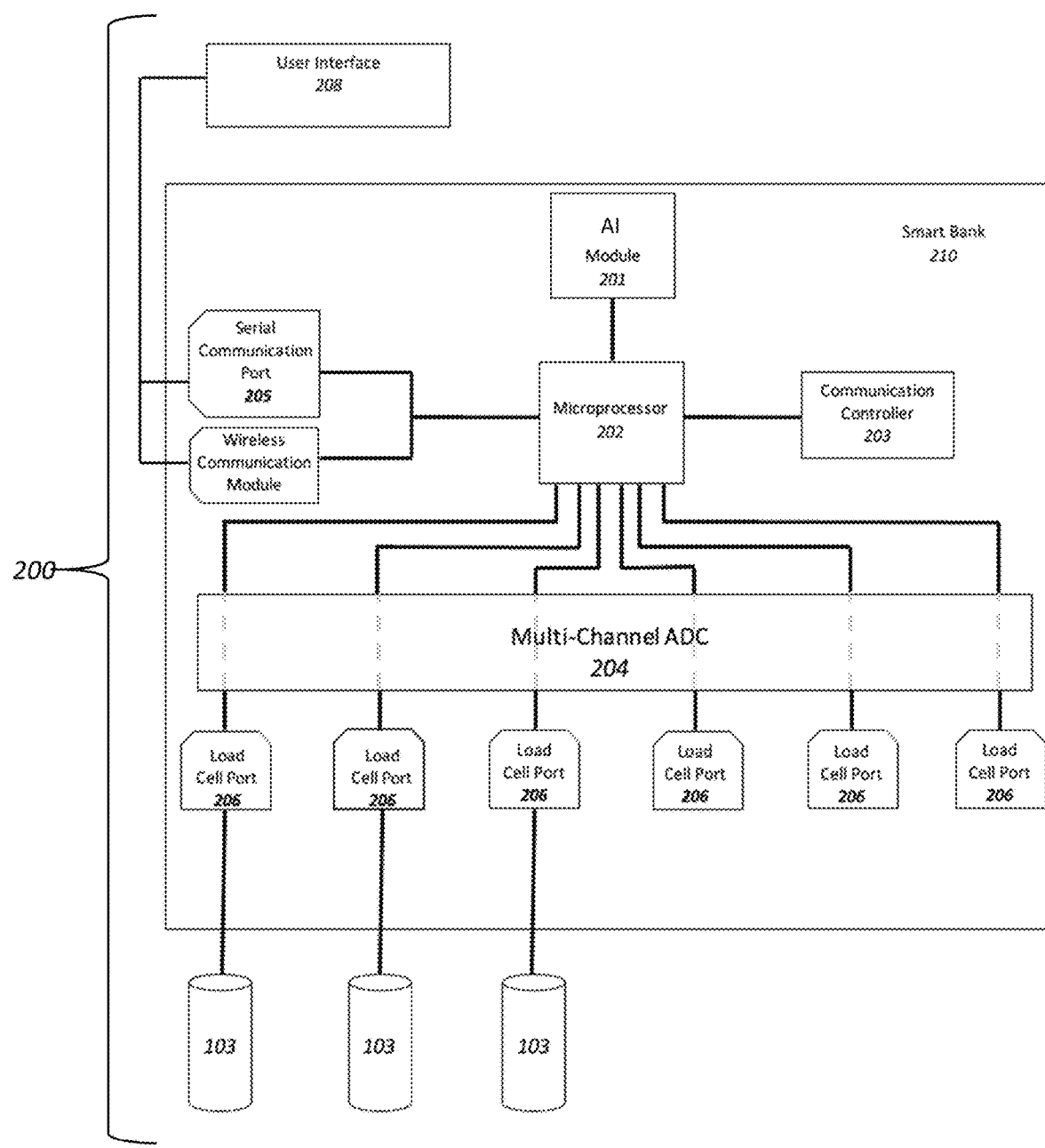
FIG. 2 is a block diagram of a smart junction controller according to this disclosure.

FIG. 2 shows a scale system 200 comprising a smart junction scale controller 210 according to this disclosure. Smart junction controller 210 comprises the functionality of scale indicator 101 and junction box 102, as described above. Controller 210 can convert each analog signal from multiple load cells 103 in scale system 200 to a digital output. The resulting digital outputs are individually and separately processed for the purposes of automated diagnostics, fault correction, and customizability.

Controller 210 comprises of a microprocessor 202, programmed as a scale controller, connected to a multi-channel analog to digital converter (ADC) 204, which connects microprocessor 202 to a plurality of load cells 103 through a corresponding plurality of load cell ports 206. This arrangement allows for the signal from each load cell port 206 to be received, analyzed, and interpreted individually by microprocessor 202. A communication controller 203 and a serial communication port or module 205 allows for information from microprocessor 202 to be transmitted to a user interface 208 with visual display, such as a scale indicator implemented as its own display or via software on a mobile application on a smart device. AI module 201 may also be connected to microprocessor 202 allowing for even greater diagnostic capability as well as a compensatory function that could be implemented once a load cell fault is detected. A more detailed illustration of AI module 201 is discussed below in connection with FIG. 9.

Controller 210 is comprised of individual connections to each load cell 103 through corresponding load cell ports 206 for the purpose of receiving analog signal from corresponding load cells 103. Controller 210 can be implemented on one or more printed circuit boards with embedded microprocessor 202, analog to digital conversion through ADC 204, which supports multiple simultaneous channels of analog signals, and communication controller 203. ADC 204 has multiple channels corresponding to each load cell 103 and provides a total of one conversion channel per load cell port 206. Microprocessor 202 can combine, isolate, diagnose, and alter the converted digital signals. The serial communication port 205 is capable of two-way communication with user interface 208.

In one implementation, controller 210 can replace junction box 102 in an existing system. Each load cell 103 connects to one load cell port 206 of controller 210. Controller 210 communicates the converted analog signals from each load cell 103 to user interface 208. User interface 208 can be implemented with an integrated digital display or remotely from communication port 205 via a wired connection, e.g., an RS232 serial communication interface, or a wireless connection with the signals broadcast to a compatible user interface 208, such as one implemented as a wireless display interface or smart device like a smart tablet or smart phone, though such wireless protocols as Bluetooth Low Energy or Wi-Fi communication advertisement.

Figure 3:
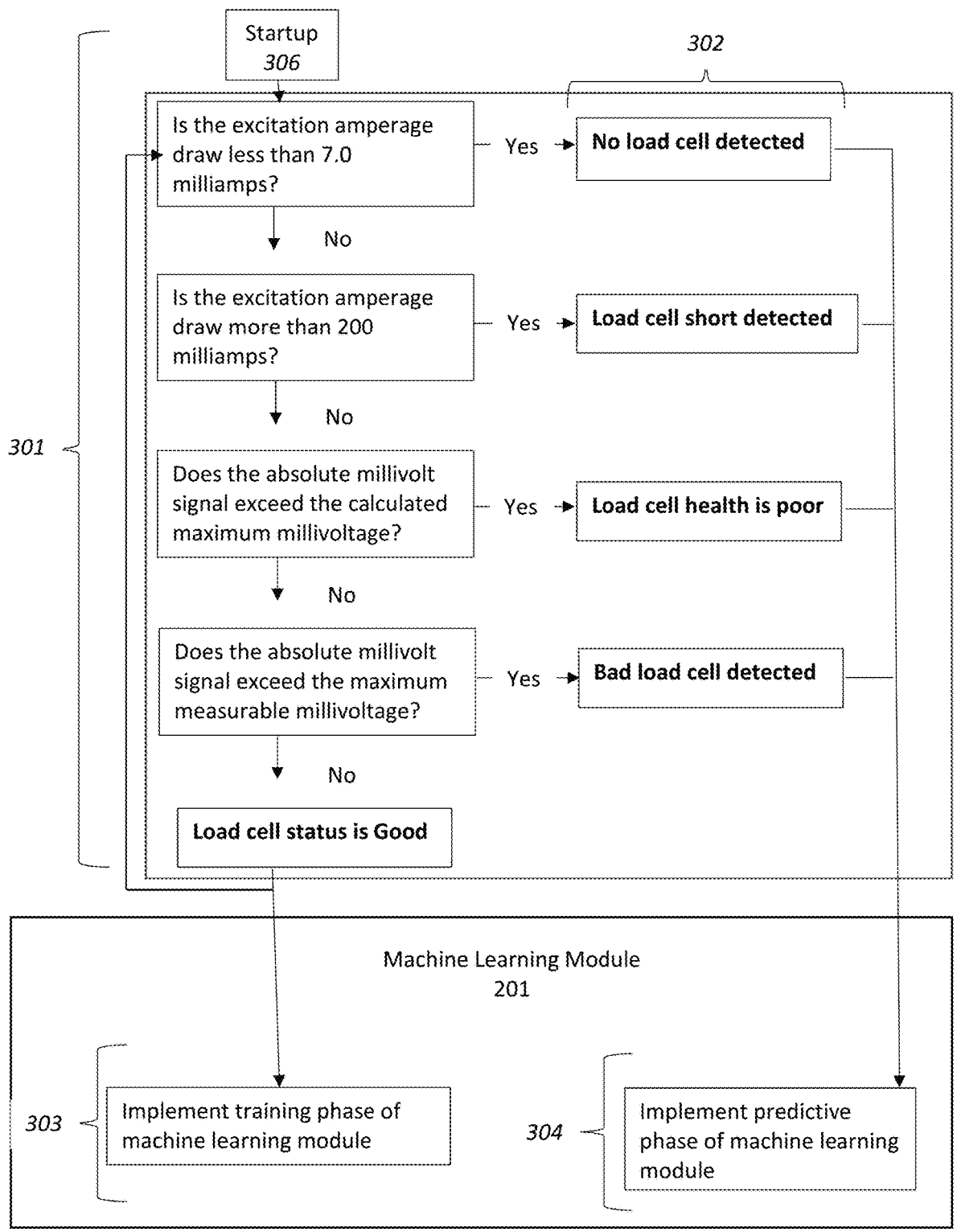
FIG. 3 is a workflow diagram showing the relationship of notification and decision gates for a bad load cell.

Controller 210 has multiple operational states. FIG. 3 illustrates a first, diagnostic state with one example of diagnostic logic 301 that could be implemented within the controller 210. Diagnostic logic 301 can run continuously or periodically on the signal from each load cell port 206 into controller 210 to create a diagnostic status 302 that can be conveyed to the user either with indication lights on controller 210 or through interfacing with another device through the serial communication port/module 205 in controller 210 of FIG. 2.

Diagnostic logic 301 comprises a series of diagnostic steps. The method begins at startup 306 followed by a query of whether the excitation amperage draw is less than a first threshold value, say 7 mA. If the answer is no, the method continues with a query of whether the amperage draw is more than a second threshold value, say 700 mA. If the answer is no, the method continues with a query of whether the absolute milivolt signal exceeds a predicted maximum milivoltage. If the answer is no, the method continues with a query of whether the milivolt signal exceeds a maximum measurable milivoltage. If the answer to any of these queries is yes, then a load cell of the plurality of load cells is in a fault state of either not being detected, in a shorted state, or in a poor or bad condition, respectively. If, on the other hand, the method continues through the series of steps and meets the required status, each load cell of the plurality of load cells is in a good operating condition. This method can operate continuously in the background on a channel for each load cell port 206 continuously checking the condition of each corresponding load cell 103.

Figure 4:
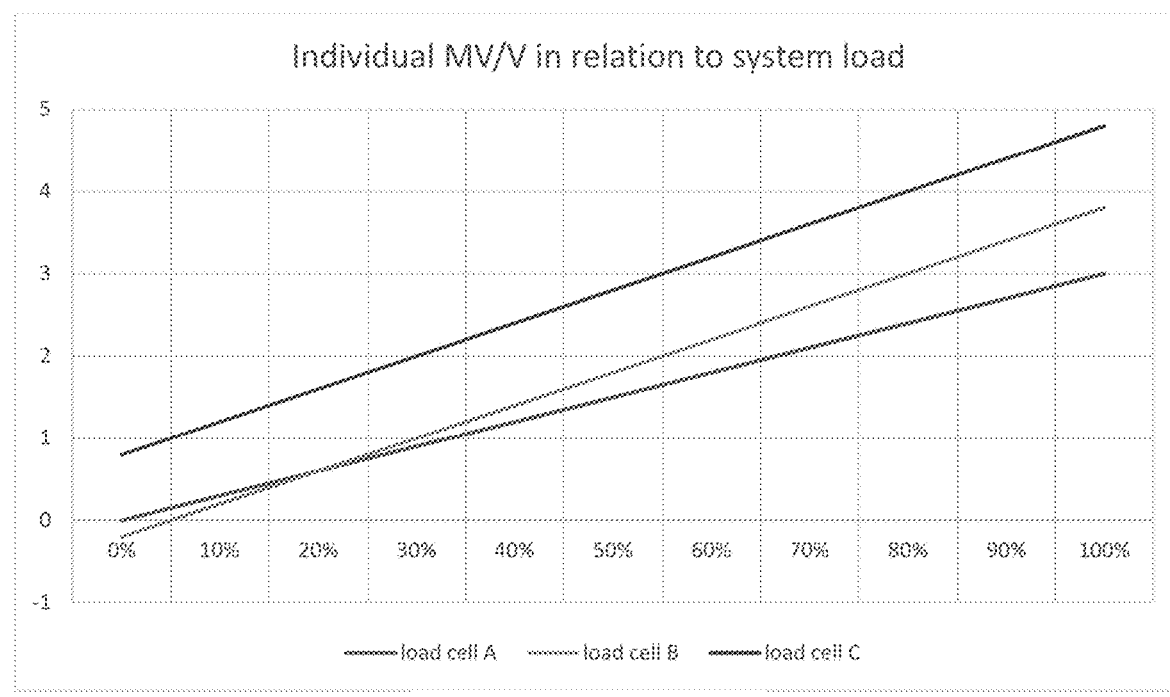
FIG. 4 is a line graph charting the MV/V outputs of several load cells in a scale system in relation to the load placed in one position on the system.

As long as the load cell 103 is in a good operating condition, as described above, AI module 201 operates in a training state for that load cell 103. In the training state 303, controller 210 has been determined to be operating correctly with no load cell faults being detected in the diagnostic state. Data is collected and stored in a library 902 of AI module 201 regarding the relationships between the signals received at load cell port 206 during normal scale use. FIG. 4 illustrates, for example, the relationships of milivolts per volt signals (Y-axis) from three load cells 103 in a hypothetical system and how those relationships change as load (X-axis) expressed as a percent of rated capacity is varied within a specific distribution. The data in FIG. 4 is derived from data stored in library 902 as representative of the corresponding load cells 103 operating in good condition.

Figure 6:
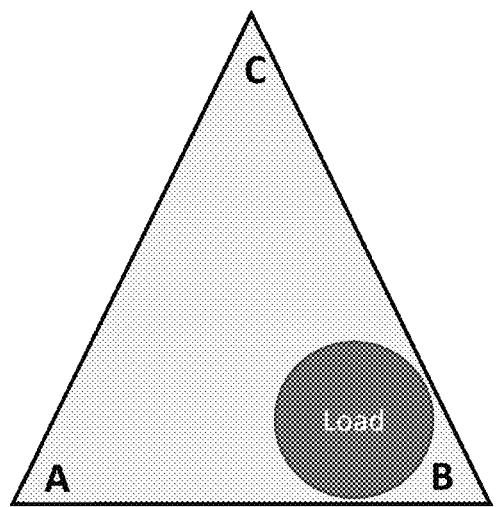
FIG. 6 is several drawings representing examples of load placement on a system of 3 load cells and the resulting weight distribution each load cell might experience.
Figure 6:
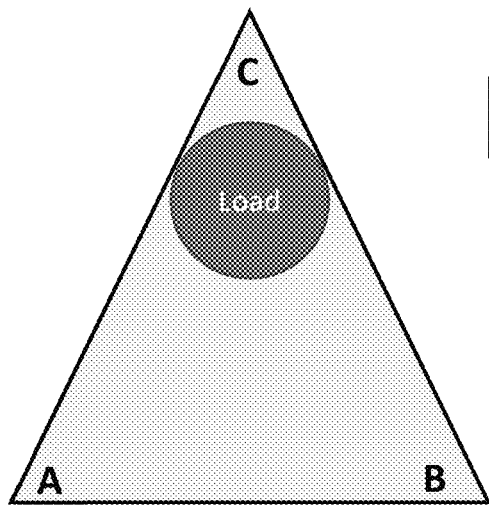
Figure 6:
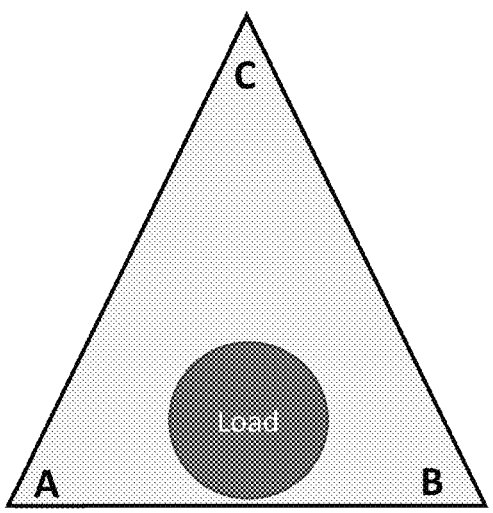
Figure 7:
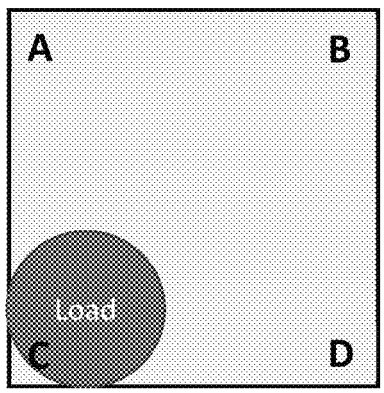
FIG. 7 is several drawings representing examples of load placement on a system of 4 load cells and the resulting weight distribution each load cell might experience.
Figure 7:
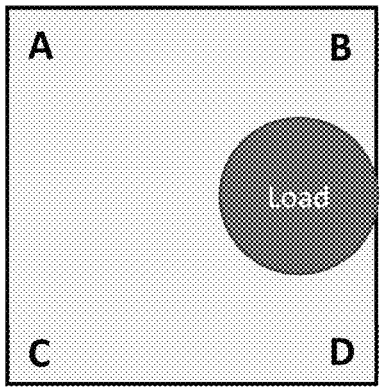
Figure 7:
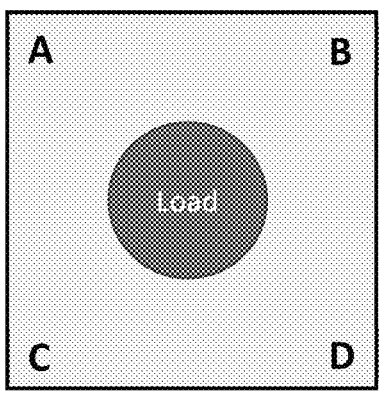

FIG. 6 and FIG. 7 further illustrate how load placement might affect the relationships of the signals detected by controller 210 and interpreted by AI module 201. FIG. 6 shows examples of several possible different load placements and the resulting signal distributions of a three load cell system. As the load shifts from right, center-forward, and center-rear, the signal from the load cells nearest the load increase and those further away decrease. FIG. 7 shows examples of several possible different load placements and the resulting signal distributions of a four load cell system. Similar to the previous figure the signal from the load cells nearest the load increase and those further away decrease but with additional complexity due to the greater number of load cells. AI module 201 is continuously trained with the bias information derived from the load placement with respect to each of load cells 103. With all of this information being stored when controller 210 is operating in the training state, AI module 201 can deduce with a high degree of accuracy the reading from a load cell port 206 with a corresponding failed load cell 103.

The standard operational state of controller 210 is the training state. In training state 303, the diagnostics 301 are continuously running to confirm each load cell 103 is operating in good condition and AI module 201 is constantly receiving, storing and analyzing normal operational data. The longer controller 210 operates in the normal operating state of training state 303, the more information AI module 201 obtains, stores, and learns from. Once a load cell fault is detected using the diagnostic logic in FIG. 3, however, the predictive state 304 can be implemented and learning state 303 paused.

Figure 5:
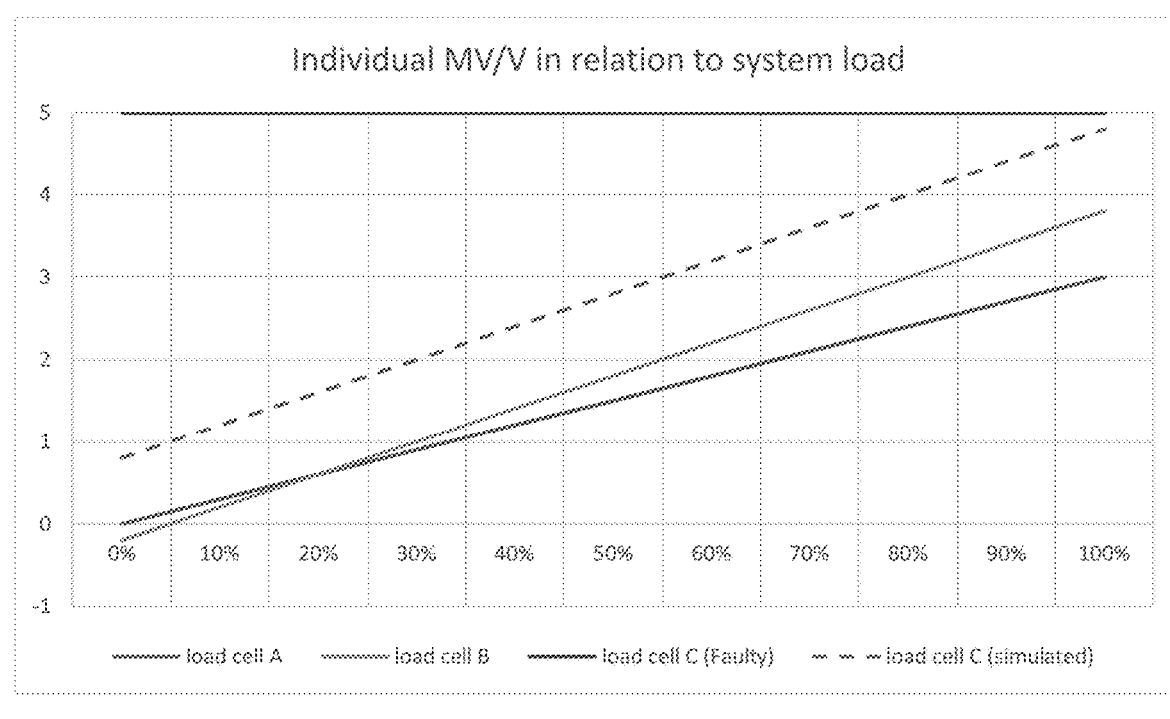
FIG. 5 is a line graph charting the MV/V outputs of the same system of load cells as in FIG. 4 but load cell C is now faulty. Additionally, a simulated or machine learning generated output for load cell C is also included.

Turning back to FIG. 5, the same three load cell system shown previously in FIG. 4 have now detected a fault from load cell C and controller 210 enters predictive state 304 during operation. Assuming enough historical data about load cell C's relationship to the other load cell signals has been collected by AI module 201, it may generate a simulated output to replace that of the faulty load cell C. Microprocessor 202 can then disable the input from load cell C and use the simulated output generated by AI module 201 to output a reasonable approximation of the load actually present on the corresponding scale. The ability of controller 210 to replace a faulty signal with a simulated one and generate a reasonably accurate load estimate is a great advantage over current electronic scale systems. An estimated load reading could help a user continue to use the scale in some manor until a repair can be made and the detected fault cleared.

Figure 9:
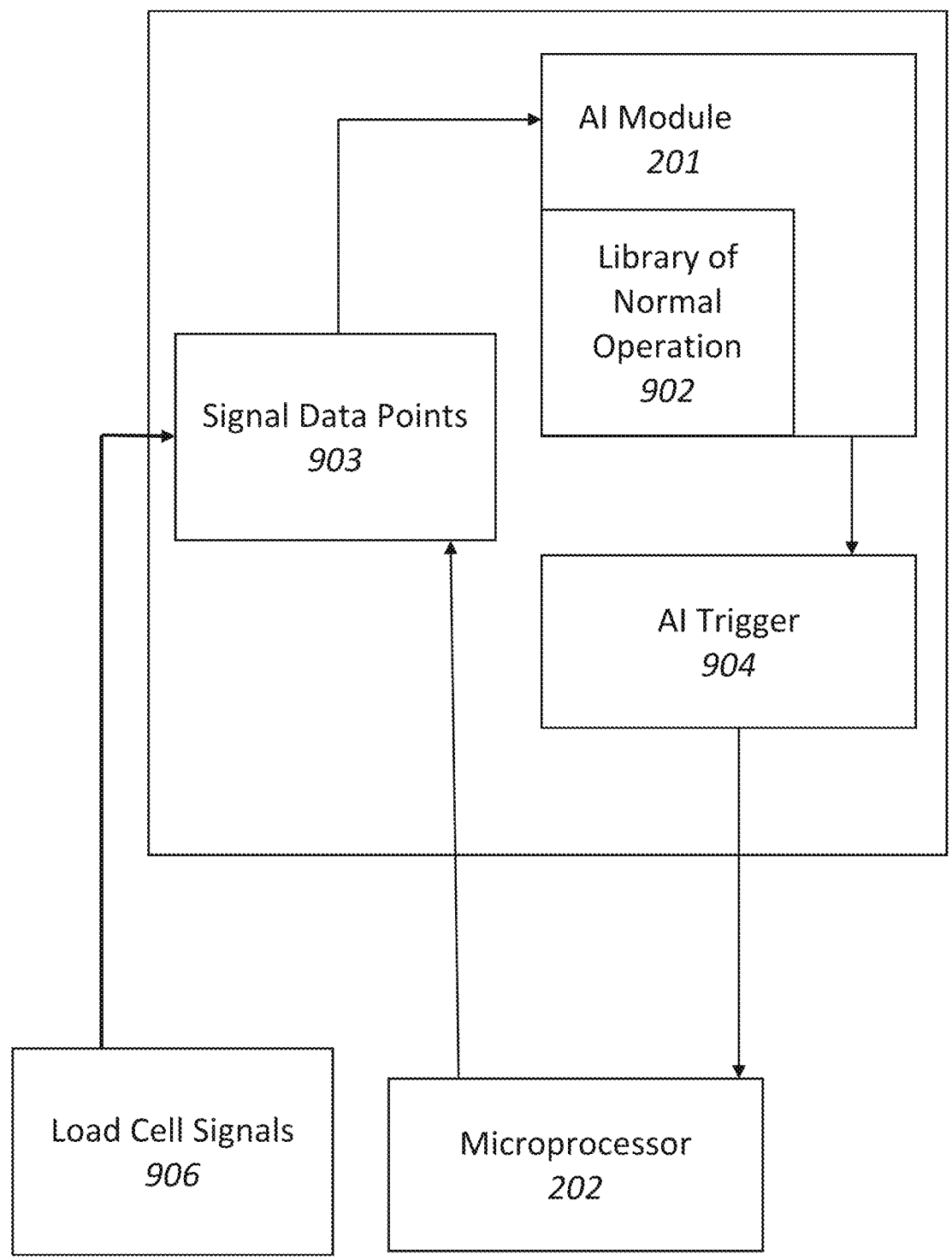
FIG. 9 is a drawing of the machine learning system and its components.

FIG. 9 shows how AI module 201 operating with microprocessor 202 is trained. In training state 303, data 903 from load cell signals 906 is collected and used to train AI module 201 by storing data from each load cell in a library 902 of normal operation, which is used to train a model for each load cell 103. The generated model will then be validated by being compared directly against more data points from the system. More specifically, data 903 from load cell signals 906 are recorded continuously and provided to AI module 201, as described above. AI module 201 may include a neural network (NN), e.g., a convolutional neural network (CNN). Any suitable AI method and/or neural network may be implemented, e.g., using known techniques.

AI module 201 includes library 902 of normal operation for each load cell 103, which is used to compare in real-time data that is recorded continuously and provided to AI module 201. When a fault is detected, microprocessor 202 can disable the input from load cell 103 in the fault state. This event acts as trigger 904 to change the system to the predictive state 304 and for AI module 201 to output a reasonable approximation of the load actually present on the corresponding load cell 103. In place of the signal from that load cell 103. The neural network may even provide a confidence level with respect to its approximation.

Figure 8:
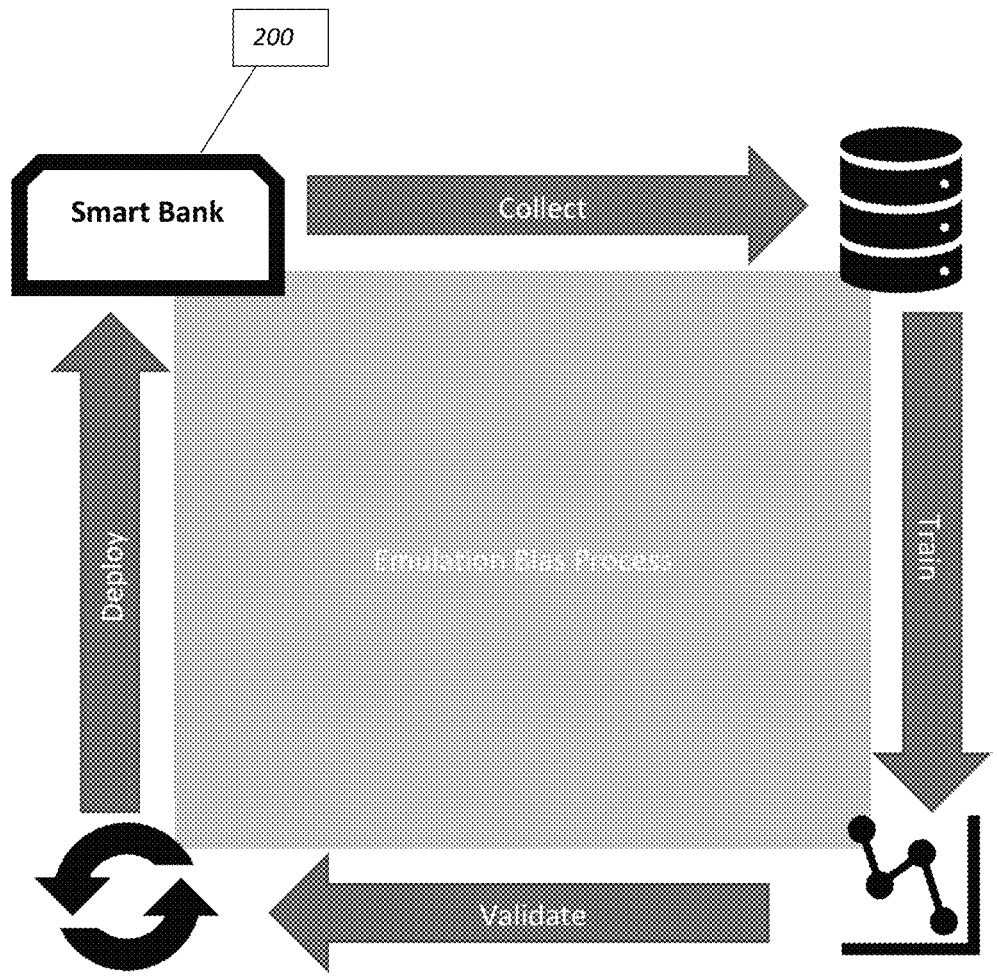
FIG. 8 is a depiction of the machine learning process by which the smart bank collects and utilizes data to generate a simulated output for a faulty load cell.

FIG. 8 is a block diagram of the process by which the AI module 201 will learn and generate the simulated output by transitioning between the training state and predictive state. During normal scale operation the system will collect load cell signal data. This data will be used to train AI module 201. As new data is continuously collected, it is compared to the predictive model generated by the AI module 201 to either validate or improve its accuracy. Once a load cell fault occurs, the validated predictions can be deployed to emulate load cell 103 that has produced the fault. Once a fault is resolved, the emulation stops and the system returns collecting data in training state 303.

The foregoing scale system 200 comprising smart junction scale controller 210 according to this disclosure has several advantages over the prior art. With each load cell signal digitized by ADC 204, system 200 can run diagnostics on each load cell 103. Prior art systems, digitize the sum of the load cell to derive an average millivolt sum of the analog signals from all of load cells 103. This prevents diagnostics on each load cell 103. Because data from each load cell 103 is analyzed individually, system 200 can obtain and store historical data on the accuracy of each load cell 103. This allows for the creation of the approximation for each load cell 103, which can then be used for predictive purposes in the event of a fault. In prior art systems, when a load cell 103 faults, the resulting weight seen by the scale controller can be as much as 50% off plus or minus either way, depending on how the load sits in relation to the functional load cells 103. By replacing the faulted load cell 103 with a predictive signal, the accuracy of the system is greatly improved.

With these benefits in mind, one skilled in the art would see that smart junction scale controller 210 is programmable to sum the digital signals corresponding to the analog outputs of the load cells 103 in the system into different configurable combinations. Summed output values can be calculated for a designated group of load cells 103 within the system or for one individual load cell 103 within the system. The programmable summing allows a single scale system to act as two or more separate scales. For example: a single scale system installed on two or more containers could calculate the weight of each individual container as well as the total of them all. Furthermore, the output of each load cell 106 can be individually analyzed for diagnostic purposes. An output determined to be faulty can be flagged and communicated to the operator through the scale indicator, error lights or other interface. Individual outputs of load cells 103 determined to be faulty by diagnostics can be corrected or simulated. The faulty output can be excluded and the summed output corrected based on the output of the remaining functional load cells 103. Artificial intelligence or machine learning in AI module 201 can then be used to generate a simulated output to replace that of the faulty load cell 103. Historical data is recorded comparing the relationships of the outputs relative to each other. This data is then utilized to provide improved accuracy during a component failure.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

We claim:

1. A method for weighing a load comprising:
providing a scale controller comprising a plurality of load cell ports, an analog to digital convertor (ADC) communicatively coupled to the plurality of load cell ports, and a microprocessor;
receiving in each of the plurality of load cell ports one of a corresponding plurality of analog signals each of which is representative of a portion of the load measured by a corresponding plurality of load cells;
converting with the ADC the plurality of analog signals into a plurality of digital signals corresponding to the plurality of load cells; and
running with the microprocessor a diagnostic on each of the plurality of digital signals to determine an operational condition of each of the plurality of load cells.

2. The method of claim 1, further comprising: switching a state of operation between a training state and a predictive state based on the determination of the operational condition of each of the plurality of load cells.

3. The method of claim 2, further comprising: storing a data representative of the portion of the load measured by each of the corresponding plurality of load calls in the training state.

4. The method of claim 3, further comprising: estimating the data representative of the portion of the load measured by a failed load cell of the plurality of load cells in the predictive state.

5. The method of claim 1, further comprising: summing data from a group of load cells of the plurality of load cells to differentiate between a portion of the load measured by two or more groups of load cells of the plurality of load cells.

6. The method of claim 1, further comprising: communicating to an operator a diagnostic state of each load cell of the plurality of load cells.

7. The method of claim 1, further comprising: generating a simulated output for a failed load cell.

8. A scale controller comprising:
a plurality of load cell ports each of which communicatively couplable to a corresponding one of a plurality of load cells to receive analog signals representative of a portion of a load thereon;
an analog to digital convertor (ADC) communicatively coupled to the plurality of load cell ports to convert the analog signals into corresponding digital signals; and
a microprocessor configured to run a diagnostic on each of the digital signals corresponding to each of the plurality of load cells to determine an operational state of each of the plurality of load cells.

9. The scale controller of claim 8, further comprising a user interface in communication with the microprocessor to receive information representative of the operational state of each of the plurality of load cells.

10. The scale controller of claim 9, wherein the microprocessor sums data from a group of load cells of the plurality of load cells to differentiate between a portion of the load measured by two or more groups of load cells of the plurality of load cells.

11. The scale controller of claim 8, wherein the microprocessor generates a simulated output for a failed load cell.

12. The scale controller of claim 8, further comprising an AI module in communication with the microprocessor for storing in a library a data from each load cell of the plurality of load cells.

13. The scale controller of claim 12, wherein the AI module estimates data representative of a failed load cell of the plurality of load cells based on the data stored in the library corresponding to the failed load cell.

14. The scale controller of claim 13, wherein the AI module operates with respect to each load cell in a training state and a predictive state.

15. The scale controller of claim 14, wherein in the training state, the library stores for each load cell of the plurality of load cells the data representative of the portion of the load thereon.

16. The scale controller of claim 15, wherein the predictive state for the failed load cell of the plurality of load cells is triggered by the diagnostic ran by the microprocessor.

17. The scale controller of claim 16, wherein the AI module estimates the data the data representative of the portion of the load on the failed load cell based on the data stored in the library.

* * * * *